US011992056B2

(12) United States Patent
Park et al.

(10) Patent No.: US 11,992,056 B2
(45) Date of Patent: May 28, 2024

(54) DEVICE AND SYSTEM FOR GENERATING AEROSOL BY USING INDUCTIVE HEATING

(71) Applicant: KT&G CORPORATION, Daejeon (KR)

(72) Inventors: Sang Kyu Park, Hwaseong-si (KR); Jong sub Lee, Seongnam-si (KR); Seung Won Lee, Gwangmyeong-si (KR); Jae Min Lee, Siheung-si (KR); Soung Ho Ju, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 917 days.

(21) Appl. No.: 17/041,177

(22) PCT Filed: Nov. 7, 2019

(86) PCT No.: PCT/KR2019/015068
§ 371 (c)(1),
(2) Date: Sep. 24, 2020

(87) PCT Pub. No.: WO2020/122428
PCT Pub. Date: Jun. 18, 2020

(65) Prior Publication Data
US 2021/0093009 A1 Apr. 1, 2021

(30) Foreign Application Priority Data
Dec. 11, 2018 (KR) ........................ 10-2018-0159090

(51) Int. Cl.
*A24F 13/00* (2006.01)
*A24F 40/20* (2020.01)
(Continued)

(52) U.S. Cl.
CPC ............ *A24F 40/465* (2020.01); *A24F 40/20* (2020.01); *A24F 40/51* (2020.01); *A24F 40/57* (2020.01);
(Continued)

(58) Field of Classification Search
CPC ........................................................ A24F 47/00
(Continued)

(56) References Cited

U.S. PATENT DOCUMENTS 6,026,820 A 2/2000 Baggett, Jr. et al.
9,220,304 B2 12/2015 Greim
(Continued)

FOREIGN PATENT DOCUMENTS

CN 106617325 A 5/2017
CN 107205490 A 9/2017
(Continued)

OTHER PUBLICATIONS

Korean Office Action for KR 10-2018-0159090 dated, Jun. 18, 2020.
(Continued)

*Primary Examiner* — Phuong K Dinh
(74) *Attorney, Agent, or Firm* — Sughrue Mion, PLLC

(57) ABSTRACT

Provided is an apparatus for generating an aerosol by induction heating, the apparatus including: at least one susceptor formed in an elongated structure extending in a longitudinal direction of a cigarette to be accommodated in the apparatus, and arranged to be inserted into the cigarette to heat the cigarette; an ejector including an accommodating space for accommodating the cigarette, and an opening formed at one end of the accommodating space so that the cigarette is inserted in the accommodating space, wherein the at least one susceptor is arranged opposite the one end in the accommodating space, and the ejector is detached from
(Continued)

and attached to the apparatus together with the at least one susceptor; and a coil arranged to surround the ejector along the longitudinal direction when the ejector is coupled to the apparatus, and configured to apply an alternating magnetic field to the at least one susceptor so that the at least one susceptor generates heat.

12 Claims, 9 Drawing Sheets

(51) Int. Cl.

| | |
|---|---|
| ***A24F 40/465*** | (2020.01) |
| ***A24F 40/51*** | (2020.01) |
| ***A24F 40/57*** | (2020.01) |
| ***H05B 6/06*** | (2006.01) |
| ***H05B 6/10*** | (2006.01) |
| *H05B 6/36* | (2006.01) |

(52) U.S. Cl.
CPC ............... *H05B 6/06* (2013.01); *H05B 6/105* (2013.01); *H05B 6/36* (2013.01)

(58) Field of Classification Search
USPC .................................................. 131/328–329
See application file for complete search history.

(56) References Cited

U.S. PATENT DOCUMENTS

| | | | |
|---|---|---|---|
| 10,028,533 | B2 | 7/2018 | Fursa et al. |
| 10,588,347 | B2 | 3/2020 | Malgat et al. |
| 10,986,869 | B2 | 4/2021 | Zinovik et al. |
| 11,019,848 | B2 | 6/2021 | Rojo-Calderon |
| 11,234,457 | B2 | 2/2022 | Mironov et al. |
| 11,324,259 | B2 * | 5/2022 | Courbat ................. H05B 6/108 |
| 11,382,358 | B2 * | 7/2022 | Batista .................. A24F 40/465 |
| 11,478,018 | B2 * | 10/2022 | Mironov ................ H05B 6/108 |
| 2014/0305449 | A1 | 10/2014 | Plojoux et al. |
| 2016/0374397 | A1 | 12/2016 | Jordan et al. |
| 2017/0055580 | A1 | 3/2017 | Blandino et al. |
| 2017/0055583 | A1 | 3/2017 | Blandino et al. |
| 2017/0055585 | A1 | 3/2017 | Fursa et al. |
| 2017/0119054 | A1 | 5/2017 | Zinovik et al. |
| 2018/0000157 | A1 | 1/2018 | Batista et al. |
| 2018/0125119 | A1 | 5/2018 | Cadieux et al. |
| 2018/0289067 | A1 | 10/2018 | Courbat et al. |
| 2018/0310622 | A1 | 11/2018 | Mironov et al. |
| 2019/0230987 | A1 | 8/2019 | Wu et al. |
| 2020/0093177 | A1 | 3/2020 | Han et al. |
| 2021/0084981 | A1 * | 3/2021 | Rogan ...................... A24D 1/20 |
| 2022/0087310 | A1 | 3/2022 | Han et al. |

FOREIGN PATENT DOCUMENTS

| | | | |
|---|---|---|---|
| CN | 207220159 | U | 4/2018 |
| CN | 108135266 | A | 6/2018 |
| CN | 108135276 | A | 6/2018 |
| CN | 108433193 | A | 8/2018 |
| CN | 207766584 | U | 8/2018 |
| CN | 207927771 | U | 10/2018 |
| CN | 207968988 | U | 10/2018 |
| CN | 207978953 | U | 10/2018 |
| EP | 3217817 | | 9/2017 |
| KR | 10-0385395 | B1 | 8/2003 |
| KR | 10-1667124 | B1 | 10/2016 |
| KR | 10-2017-0003909 | A | 1/2017 |
| KR | 10-2017-0007235 | A | 1/2017 |
| KR | 10-2018-0033295 | A | 4/2018 |
| KR | 10-2018-0069895 | A | 6/2018 |
| KR | 10-2018-0070515 | A | 6/2018 |
| KR | 10-2018-0111460 | A | 10/2018 |
| RU | 2665435 | C1 | 8/2018 |
| RU | 2670060 | C2 | 10/2018 |
| RU | 2674612 | C2 | 12/2018 |
| WO | 2016/075436 | A1 | 5/2016 |
| WO | 2018/099999 | A1 | 6/2018 |
| WO | 2018/211084 | A1 | 11/2018 |
| WO | 2020/182712 | A1 | 9/2020 |

OTHER PUBLICATIONS

International Search Report for PCT/KR2019/015068 dated Feb. 19, 2020 (PCT/ISA/210).
Communication dated Dec. 7, 2022 in from the China National Intellectual Property Administration in Application No. 201980017721.4.
Extended European Search Report dated Dec. 22, 2021 in European Application No. 19894795.4.
Office Action dated Mar. 3, 2022 in Russian Application No. 2021113579.
Notice of Reasons for Refusal dated May 25, 2021 from the Japanese Patent Office in JP Application No. 2020-536626.
Office Action dated May 24, 2023 in Chinese Application No. 201980017721.4.
Office Action dated Sep. 9, 2023 in Chinese Application No. 201980017721.4.

* cited by examiner

DEVICE AND SYSTEM FOR GENERATING AEROSOL BY USING INDUCTIVE HEATING

CROSS REFERENCE TO RELATED APPLICATIONS

This application is a National Stage of International Application No. PCT/KR2019/015068 filed Nov. 7, 2019, claiming priority based on Korean Patent Application No. 10-2018-0159090, filed Dec. 11, 2018.

TECHNICAL FIELD

The present disclosure relates to an apparatus and system for generating an aerosol by an induction heating method. More particularly, the present disclosure relates to an apparatus and system for generating an aerosol by heating a cigarette through a susceptor and a coil.

BACKGROUND ART

Recently, demand for a method of generating an aerosol by heating a tobacco medium in a cigarette, rather than by combusting a cigarette, has increased. Accordingly, research on heating-type cigarettes and heating-type aerosol generating apparatuses has been actively conducted.

There have been proposed heating methods different from a method that uses a heater formed of an electric resistor arranged inside or outside a cigarette accommodated in an aerosol generating apparatus such that electric power is supplied to the heater to heat the cigarette. Particularly, research has been conducted on an induction heating method in which a cigarette includes a magnetic material that generates heat by receiving a magnetic field from the outside, and current is supplied to a conducting wire provided in the aerosol generating apparatus such that a magnetic field is applied to the cigarette to generate an aerosol.

Since the magnetic material that generates heat due to the magnetic field is included inside the cigarette, it may be difficult for the aerosol generating apparatus to measure the temperature of the magnetic material, and therefore, it may be difficult to control the temperature at which the cigarette is heated. In addition, when cigarettes containing a magnetic material therein are not uniformly manufactured, an aerosol and a flavor may be provided differently for each cigarette, which may cause problems. In order to improve the induction heating method using a magnetic material contained inside the cigarette, it may be necessary to change the structure of an aerosol generating apparatus using an induction heating method.

DESCRIPTION OF EMBODIMENTS

Technical Problem

Various embodiments are for providing apparatus and systems for generating an aerosol by an induction heating method. The technical problems to be solved by the present disclosure are not limited to the technical problems as described above, and other technical problems may be driven from the following embodiments.

Solution to Problem

According to an aspect of the present disclosure, provided is an apparatus for generating an aerosol by and induction heating method, the apparatus including: at least one susceptor formed in an elongated structure extending in a longitudinal direction of a cigarette to be accommodated in the apparatus, and arranged to be inserted into the cigarette to heat the cigarette; an ejector including an accommodating space for accommodating the cigarette, and an opening formed at one end of the accommodating space so that the cigarette is inserted in the accommodating space, wherein the at least one susceptor is arranged opposite the one end in the accommodating space, and the ejector is detachably coupled to the apparatus together with the at least one susceptor; and a coil arranged to surround the ejector along the longitudinal direction when the ejector is coupled to the apparatus, and configured to apply an alternating magnetic field to the at least one susceptor so that the at least one susceptor generates heat.

According to another aspect of the present disclosure, provided is a system for generating an aerosol by an induction heating method, the system including: an apparatus configured to generate an aerosol by an induction heating method; and a cigarette accommodated in an apparatus, wherein the apparatus includes: at least one susceptor formed in an elongated structure extending in a longitudinal direction of the cigarette and arranged to be inserted into the cigarette to heat the cigarette; an ejector including an accommodating space for accommodating the cigarette, and an opening formed at one end of the accommodating space so that the cigarette is inserted in the accommodating space, wherein the at least one susceptor is arranged opposite the one end in the accommodating space, and the ejector is detachably coupled to the apparatus together with the at least one susceptor; and a coil arranged to surround the ejector along the longitudinal direction when the ejector is coupled to the apparatus, and configured to apply an alternating magnetic field to the at least one susceptor so that the at least one susceptor generates heat.

Advantageous Effects of Disclosure

Since at least one susceptor is provided in the apparatus for generating the aerosol by the induction heating method according to the present disclosure, the temperature of the susceptor can be directly measured, and thus the temperature at which the cigarette is heated can be more precisely controlled, compared to the case where the susceptor is included in the cigarette.

Since the ejector is provided in the apparatus for generating the aerosol, at least one susceptor can be attached to and detached from the apparatus together with the ejector, thereby making it easy to clean the apparatus. In addition, the ejector may prevent the apparatus from being contaminated by droplets leaking from the cigarette.

BEST MODE

Figure 1:
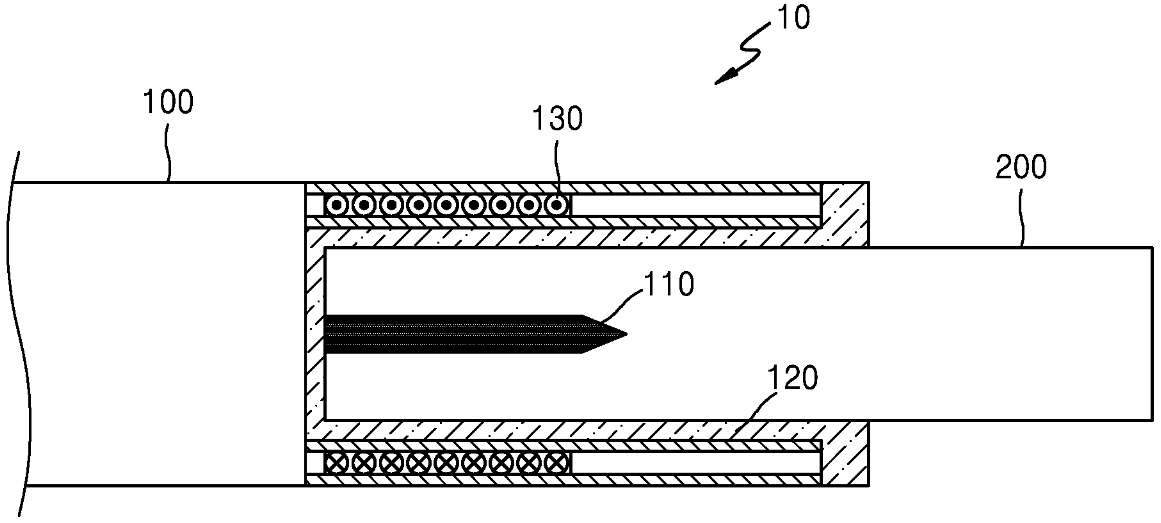
FIG. 1 is a diagram showing elements constituting a system for generating an aerosol by an induction heating method according to some embodiments.

According to an aspect of the present disclosure, provided is an apparatus for generating an aerosol by an induction heating method, the apparatus including: at least one susceptor formed in an elongated structure extending in a longitudinal direction of a cigarette to be accommodated in the apparatus, and arranged to be inserted into the cigarette to heat the cigarette; an ejector including an accommodating space for accommodating the cigarette, and an opening formed at one end of the accommodating space so that the cigarette is inserted in the accommodating space, wherein the at least one susceptor is arranged opposite the one end in the accommodating space, and the ejector is detachably coupled to the apparatus together with the at least one susceptor; and a coil arranged to surround the ejector along the longitudinal direction when the ejector is coupled to the apparatus, and configured to apply an alternating magnetic field to the at least one susceptor so that the at least one susceptor generates heat.

MODE OF DISCLOSURE

Hereinafter, exemplary embodiments will be described in detail with reference to the accompanying drawings. The following description is only for the purpose of embodying the embodiments and does not limit the scope of the present disclosure. What can be easily inferred by experts in the art from the detailed description and examples should be construed as falling within in the scope of the present disclosure.

The terms “consist(s) of” or “include(s) (or comprise(s))” should not be interpreted or understood as including, without exception, all of the plurality of elements or the plurality of steps disclosed in the description. In other words, it should be understood that some of the elements or some of the steps may not be included, or that additional elements or steps may be further included.

Terms including an ordinal number such as ‘first’ or ‘second’ as used herein may be used to describe various components, but the components should not be limited by the terms. The terms are used only for the purpose of distinguishing one component from other components.

With respect to the terms used in the specification, general terms which are currently and widely used are selected in consideration of functions of structural elements in the various embodiments of the present disclosure. However, meanings of the terms may be changed according to intention, a judicial precedence, the appearance of new technology, and the like. In addition, in certain cases, terms which are not commonly used may be selected. In such a case, the meanings of the terms will be described in detail at the corresponding portions in the following description of the embodiments. Therefore, the terms used in the various embodiments should be defined based on the meanings of the terms and the descriptions provided herein.

The present embodiments relate to an apparatus and a system for generating an aerosol by an induction heating method, and detailed descriptions of the matters well known to those skilled in the art to which the following embodiments pertain will be omitted.

FIG. 1 is a diagram showing elements constituting a system for generating an aerosol by an induction heating method according to some embodiments.

Referring to FIG. 1, the system 10 for generating an aerosol by an induction heating method may include an apparatus 100 and a cigarette 200 for generating the aerosol by the induction heating method. The apparatus 100 may include at least one susceptor 110, an ejector 120, and a coil 130.

The induction heating method may refer to a method of generating heat from a magnetic material by applying an alternating magnetic field whose direction is periodically changed to a magnetic material that is configured to generate heat by an external magnetic field. The apparatus 100 and the system 10 may generate the aerosol by heating the cigarette 200 by the induction heating method.

When the alternating magnetic field is applied to the magnetic material, energy loss due to eddy current loss and hysteresis loss may occur in the magnetic material, and the lost energy may be emitted from the magnetic material as thermal energy. As the amplitude and frequency of the alternating magnetic field applied to the magnetic material increase, more heat energy may be emitted from the magnetic material. Accordingly, the apparatus 100 may heat the cigarette 200 using thermal energy emitted from the magnetic material by applying a magnetic field to the magnetic material.

The magnetic material that generates heat by an external magnetic field may be a susceptor. The apparatus 100 may include at least one susceptor 110 that generates heat by an external magnetic field. The apparatus 100 may heat the cigarette 200 by applying a magnetic field to the susceptor 110.

The apparatus 100 may include a coil 130 that applies a magnetic field to the susceptor 110. The apparatus 100 may generate an alternating magnetic field applied to the susceptor 110 by supplying an alternating current to the coil 130.

The apparatus 100 may include an ejector 120. The ejector 120 may include an accommodation space accommodating the cigarette 200. The susceptor 110 heating the cigarette 200 accommodated in the ejector 120 may be arranged at an inner end of the accommodation space. Accordingly, the susceptor 110 may be detached from the apparatus 100 together with the ejector 120.

In the apparatus 100 and the system 10, the susceptor 110 may be provided in the apparatus 100 instead of being included inside the cigarette 200. As the susceptor 110 is provided in the apparatus 100 rather than inside the cigarette 200, there may be various advantages. For example, the aerosol and flavor from the cigarette 200 may be provided more uniformly, because the cigarette does not include any susceptor materials. In addition, the temperature of the susceptor 110 can be measured directly, so the accuracy of temperature control may be improved.

Figure 2:
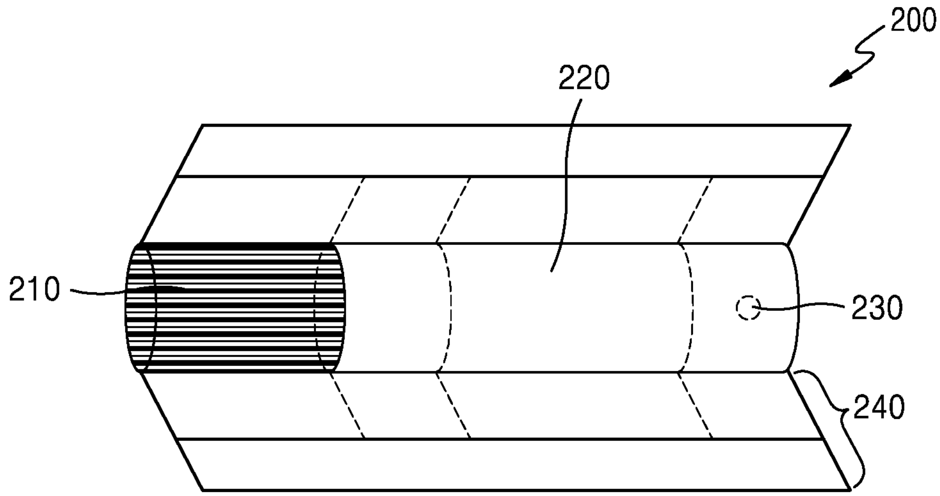
FIG. 2 is a diagram for explaining a cigarette that is heated to generate an aerosol by an induction heating method according to some embodiments.

FIG. 2 is a diagram for explaining a cigarette that is heated to generate an aerosol by an induction heating method according to some embodiments.

Referring to FIG. 2, the cigarette 200 may include a tobacco rod 210 and a filter rod 220. In FIG. 2, the filter rod 220 is illustrated as being composed of a single region, but is not limited thereto, and the filter rod 220 may be composed of a plurality of segments. For example, the filter rod 220 may include a first segment for cooling the aerosol and a second segment for filtering a specific component included in the aerosol. Also, the filter rod 220 may further include at least one segment that performs other functions.

The cigarette 200 may be packaged by at least one wrapper 240. The wrapper may have at least one hole through which external air may be introduced or internal air may be discharged. For example, the cigarette 200 may be packaged by one wrapper 240. As another example, the cigarette 200 may be double-packaged by two or more wrappers 240. Specifically, the tobacco rod 210 may be packaged by a first wrapper, and the filter rod 220 may be packaged by a second wrapper. The tobacco rod 210 and the filter rod 220 packaged by each of the wrappers are coupled, and the cigarette 200 may be entirely repackaged by a third wrapper.

The tobacco rod 210 may include an aerosol-generating material. For example, the aerosol generating material may include at least one of glycerin, propylene glycol, ethylene glycol, dipropylene glycol, diethylene glycol, triethylene glycol, tetraethylene glycol, and oleyl alcohol, but is not limited thereto. The tobacco rod 210 may contain other additives such as a flavoring agent, a wetting agent and/or an organic acid. A flavoring liquid such as menthol or moisturizer may be added to the tobacco rod 210 by spraying the flavoring liquid on the tobacco rod 210.

The tobacco rod 210 may be manufactured in various ways. For example, the tobacco rod 210 may be made of a sheet or strands. Alternatively, the tobacco rod 210 may be made of tobacco shreds formed by finely cutting a tobacco sheet.

The tobacco rod 210 may be surrounded by a heat-conducting material. For example, the heat-conducting material may be, but is not limited to, a metal foil such as an aluminum foil. The heat-conducting material surrounding the tobacco rod 210 may evenly dissipate the heat transferred to the tobacco rod 210, thereby improving the heat conductivity of the tobacco rod 210. Accordingly, the flavor of the aerosol generated from the tobacco rod 210 may be improved.

The filter rod 220 may be a cellulose acetate filter. The filter rod 220 may be formed in various shapes. For example, the filter rod 220 may be a cylindrical rod, or a tubular rod including a hollow therein. Alternatively, the filter rod 220 may be a recess shaped rod including a cavity therein. When the filter rod 220 is composed of a plurality of segments, the plurality of segments may be manufactured in different shapes.

The filter rod 220 may be manufactured to generate flavor from the filter rod 220. For example, the flavoring liquid may be sprayed on the filter rod 220, or a separate fiber to which the flavoring liquid is applied may be inserted into the filter rod 220.

The filter rod 220 may include at least one capsule 230. The capsule 230 may generate flavor or an aerosol. For example, the capsule 230 may be formed in a structure in which a liquid containing a flavoring material is wrapped with a film. The capsule 230 may have a spherical or cylindrical shape, but is not limited thereto.

When the filter rod 220 includes a cooling segment for cooling the aerosol, the cooling segment may include a polymer material or a biodegradable polymer material. For example, the cooling segment may be made of pure polylactic acid only. Alternatively, the cooling segment may be made of a cellulose acetate filter comprising a plurality of perforations. However, the present disclosure is not limited thereto, and the cooling segment may include a structure and a material for cooling the aerosol.

Figure 3:
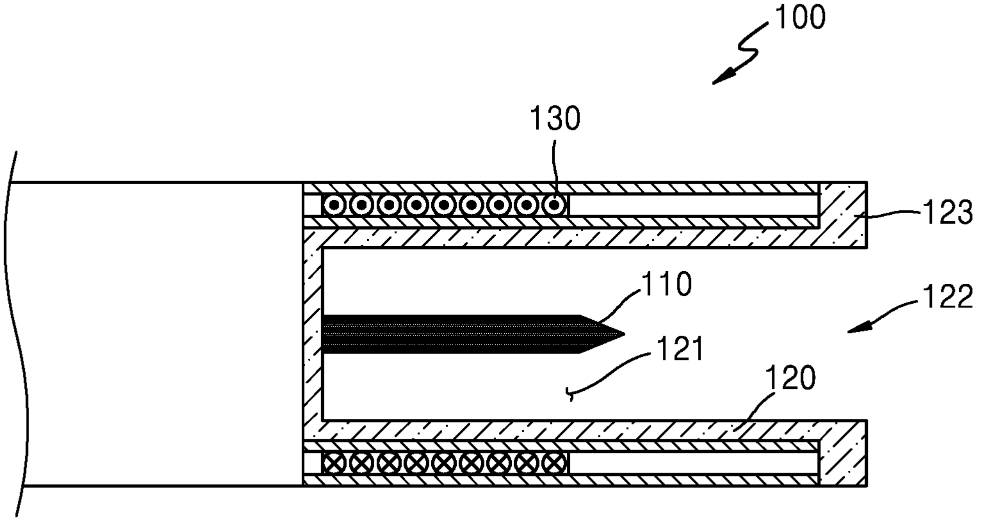
FIG. 3 is a diagram showing elements constituting an apparatus for generating an aerosol by an induction heating method according to some embodiments.

FIG. 3 is a diagram showing elements constituting an apparatus for generating an aerosol by an induction heating method according to some embodiments.

Referring to FIG. 3, an apparatus 100 for generating an aerosol by an induction heating method may include at least one susceptor 110, an ejector 120, and a coil 130. However, the present disclosure is not limited thereto, and other general-purpose elements may be further included in the apparatus 100 in addition to the elements illustrated in FIG. 3.

The susceptor 110 may be formed in an elongated structure extending in the longitudinal direction of a cigarette 200 accommodated in the apparatus 100. The longitudinal direction may refer to the axial direction of the cylindrical shape of the cigarette 200. The susceptor 110 may extend along the longitudinal direction to have a length corresponding to at least a portion of the length of the cigarette 200.

At least one susceptor 110 may be inserted into the cigarette 200 to heat the cigarette 200. The susceptor 110 may be formed in an elongated structure of a rod shape or a needle shape. As illustrated in FIG. 3, the end portion of the susceptor 110 inserted into the cigarette 200 may have a conical to polygonal shape that becomes narrower toward the end, so that the susceptor 110 can be easily inserted into the cigarette 200. The susceptor 110 inserted into the cigarette 200 may be heated due to the coil 130 to heat the cigarette 200.

The susceptor 110 may include metal or carbon. The susceptor 110 may include at least one of ferrite, ferromagnetic alloy, stainless steel, and aluminum (Al). Also, the susceptor 110 may include at least one of graphite, molybdenum, silicon carbide, niobium, a nickel alloy, a metal film, ceramic such as zirconia, transition metal such as nickel (Ni) or cobalt (Co), and metalloid such as boron (B) or phosphorus (P).

The ejector 120 may include an accommodating space 121 for accommodating the cigarette 200 and an opening 122 opened to the outside from one end of the accommodating space 121 so that the cigarette 200 is accommodated in the accommodating space 121. As the cigarette 200 is accommodated in the accommodation space 121, the susceptor 110 may be inserted into the cigarette 200.

The susceptor 110 may be arranged at the other end of the accommodating space 121 opposite the one end of the accommodating space 121. Specifically, the susceptor 110 may be arranged at the other end of the accommodation space 121 corresponding to a bottom surface of the ejector 120. In addition, the susceptor 110 may be arranged at a center portion of the bottom surface of the ejector 120, and accordingly, the cigarette 200 accommodated in the accommodating space 121 may be evenly heated.

The ejector 120 may be detachably coupled to the apparatus 100. The ejector 120 may be inserted into and fit in a space formed in the apparatus 100. To this end, the cross sections of the ejector 120 and the apparatus 100, when a cutting plane is orthogonal to a longitudinal direction of the ejector 120 and the apparatus 100, may be the same or substantially the same.

The susceptor 110 arranged at the other end of the accommodating space 121 may be detachably coupled to the apparatus 100 together with the ejector 120. The susceptor 110 may be installed in the apparatus 100, the susceptor 110 may not be directly provided in the apparatus 100, but may be provided in the ejector 120 included in the apparatus 100.

When the ejector 120 is attached to the apparatus 100, the susceptor 110 may also be attached to the apparatus 100 to operate as a part of the apparatus 100, and when the ejector 120 is detached from the apparatus 100, the susceptor 110 may also be detached from the apparatus 100.

The cigarette 200 may also be detached from the apparatus 100 together with the ejector 120. Before the start of smoking, the cigarette 200 may be accommodated in the apparatus 100 with the ejector 120, and after the end of smoking, the cigarette 200 may be separated from the apparatus 100 with the ejector 120.

The ejector 120 may further include a support 123 arranged around one end of the accommodating space 121. The support 123 may be a supporting means that allows the ejector 120 to be inserted only to a specific position in the apparatus 100. The degree to which the ejector 120 is accommodated into the apparatus 100 may be limited by the support 123. In addition, the support 123 may be a gripping means to be held by a user of the apparatus 100 when detaching the ejector 120 from the apparatus 100 or when attaching the ejector 120 to the apparatus 100.

Since the ejector 120 and the susceptor 110 arranged in the ejector 120 are detachably coupled to the apparatus 100, the cleaning the apparatus 100 may be simplified. In particular, the cleaning of the susceptor 110 that is inserted into the cigarette 200 and heats a tobacco medium may be performed more quickly. In addition, even if the susceptor 110 or the ejector 120 reaches the expiration or is damaged, the susceptor 110 or the ejector 120 may be replaced without disassembling the apparatus 100.

The maintenance and repair of the apparatus 100 may be easier in terms of cleaning and part replacement. In particular, it is possible to prevent the accumulation of tobacco residues due to repeated smoking on the apparatus 100, so that the quality of the aerosol provided by the apparatus 100 can be improved.

The ejector 120 may be made of a material having heat insulation and heat resistance. Since the susceptor 110 that generates heat for heating the cigarette 200 is arranged in the ejector 120, the ejector 120 may be made of a material having heat resistance so that the ejector 120 is not deformed or damaged by heat. In addition, the ejector 120 may be made of a material having heat insulation so that excessive heat is not transferred to the user while smoking on the apparatus 100.

For example, the ejector 120 may include at least one material of polypropylene (PP), polyether ether ketone (PEEK), polyethylene (PE), polyimide, sulfone-based resin, fluorine-based resin, and aramid. The sulfone-based resin may include resins such as polyethyl sulfone and polyphenylene sulfide, and the fluorine-based resin may include polytetrafluoroethylene (Teflon).

The coil 130 may be arranged in the apparatus 100 such that the coil 130 is wound around the ejector 120 along the longitudinal direction when the ejector 120 is coupled to the apparatus 100. The coil 130 may be arranged at a position where the ejector 120 is surrounded by the coil 130 when the ejector 120 is accommodated inside the apparatus 100. The coil 130 may extend along a longitudinal direction to have a length corresponding to at least a portion of the side of the ejector 120.

The coil 130 extending to have a length corresponding to at least a portion of the side of the ejector 120 may be arranged at a position corresponding to the susceptor 110 and have a size corresponding to the susceptor 110. Alternatively, with respect to the length extending in the longitudinal direction, the length of the coil 130 may be greater or less than the length of the susceptor 110 according to design needs.

As an example, the coil 130 may be implemented with a solenoid. The coil 130 may be a solenoid wound along the inner wall of a space in which the ejector 120 is accommodated, and the ejector 120 may be accommodated in the solenoid. The material of a conducting wire constituting the solenoid may be copper (Cu). However, the present invention is not limited thereto. The material of the conducting wire constituting the solenoid may be a material that has a low specific resistance, allowing a high current to flow. The material of the conducting wire may be any one of or an alloy including any one of silver (Ag), gold (Au), aluminum (Al), tungsten (W), zinc (Zn), and nickel (Ni).

The coil 130 may apply an alternating magnetic field to the susceptor 110 so that the susceptor 110 generates heat. When a current is applied to the coil 130 in a clockwise direction, a magnetic field having one of the lengthwise directions may be formed inside the coil 130, and when a current is applied to the coil 130 in a counterclockwise direction, a magnetic field having the opposite direction may be formed in the coil 130. Accordingly, an alternating magnetic field whose direction is periodically changed may be formed inside the coil 130 when alternating current whose direction is periodically changed is applied to the coil 130, and the coil 130 may apply the alternating magnetic field to the susceptor 110 arranged in the coil 130.

When the alternating magnetic field by the coil 130 is applied to the susceptor 110, the susceptor 110 may generate heat. Specifically, thermal energy may be emitted from the susceptor 110 by eddy current loss and hysteresis loss due to the alternating magnetic field. The cigarette 200 accommodated in the apparatus 100 may be heated by thermal energy emitted from the susceptor 110.

Figure 4:
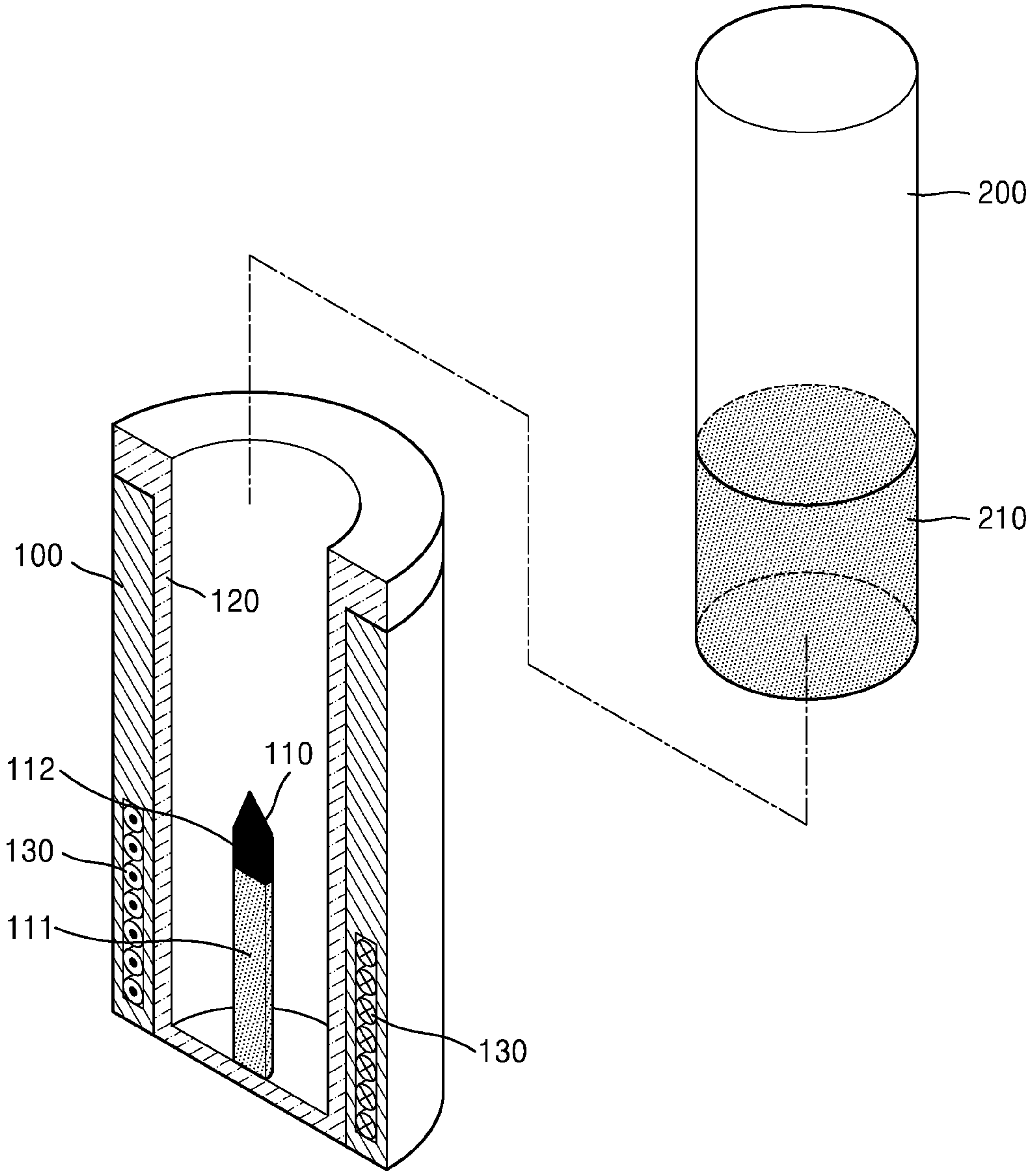
FIG. 4 is a diagram for explaining at least one susceptor including a heating portion and a non-heating portion according to some embodiments.

FIG. 4 is a diagram for explaining at least one susceptor including a heating portion and a non-heating portion according to an embodiment.

Referring to FIG. 4, a cigarette 200 accommodated in the apparatus 100, and an example of a cross-section of the apparatus 100 accommodating the cigarette 200 is illustrated.

The susceptor 110 may include a heating portion 111 and a non-heating portion 112. The heating portion 111 may be arranged at a portion which contacts a tobacco medium portion of the cigarette 200, and the heating portion 111 may generate heat due to the coil 130. The non-heating portion 112 may be arranged at the remaining portion of the susceptor 110 other than the heating portion 111.

The distribution and configuration ratio of the heating portion 111 and the non-heating portion 112 constituting the susceptor 110 may be changed. For example, unlike the example illustrated in FIG. 4, the susceptor 110 may be formed in a structure in which a heating portion is arranged between non-heating portions located at both ends.

The heating portion 111 may be formed of a ferromagnetic material. The ferromagnetic material may be magnetized in the direction of the external magnetic field and may maintain a magnetic moment even after the external magnetic field is removed. For example, the ferromagnetic material may be any one of or an alloy including at least one of iron (Fe), nickel (Ni), and cobalt (Co).

The heating portion 111 formed of the ferromagnetic material may generate heat by an alternating magnetic field applied by the coil 130. The heating portion 111 may be heated to a temperature of 450° C. or more by the alternating magnetic field. Alternatively, the heating portion 111 may be heated in the range of 200° C. to 300° C. The heating temperature of the heating portion 111 may be controlled by the amplitude and/or the frequency of the alternating magnetic field applied by the coil 130, and may also be changed by the configuration of the ferromagnetic material forming the heating portion 111.

The non-heating portion 112 may be formed of a non-ferromagnetic material. For example, the non-heating portion 112 may be formed of at least one of a diamagnetic material and a paramagnetic material. The diamagnetic material may be magnetized in the opposite direction to the external magnetic field. The paramagnetic material may be partially magnetized in the direction of the external magnetic field but loses its magnetic moment when the external magnetic field disappears.

When an alternating magnetic field is applied by the coil 130, the diamagnetic material may not be heated, and the paramagnetic material may have a smaller degree of heating compared to the ferromagnetic material. For example, the paramagnetic material may include at least one of aluminum (Al), tin (Sn), platinum (Pt), and iridium (Ir). The diamagnetic material may include metal such as bismuth (Bi), lead (Pb), and mercury (Hg), copper (Cu), graphite (C), gold (Au), and silver (Ag), which are not transition metals.

The heating portion 111 may be arranged at a position corresponding to the tobacco medium portion of the cigarette 200. As shown in FIG. 4, the height at which the heating portion 111 is formed in the susceptor 110 may correspond to the height of the tobacco rod 210 included in the cigarette 200. Accordingly, the heating portion 111 may be arranged at a portion where the susceptor 110 inserted into the cigarette 200 contacts a tobacco medium portion included in the cigarette 200.

The coil 130 may be formed to have a size corresponding to the heating portion 111 and may be arranged at a position corresponding to the heating portion 111. The coil 130 may extend in the longitudinal direction while being wound around the side of the ejector 120. Specifically, the height of the coil 130 extending in the longitudinal direction may correspond to the height of the heating portion 111 formed in the susceptor 110.

Since the heating portion 111, the tobacco rod 210, and the coil 130 are arranged to correspond one another in size and position, the coil 130 may heat the heating portion 111. Accordingly, efficiency of heating the tobacco rod 210 by the heating portion 111 may be increased, and thus the power consumed by the apparatus 100 to generate an aerosol from the cigarette 200 may be reduced.

Figure 5:
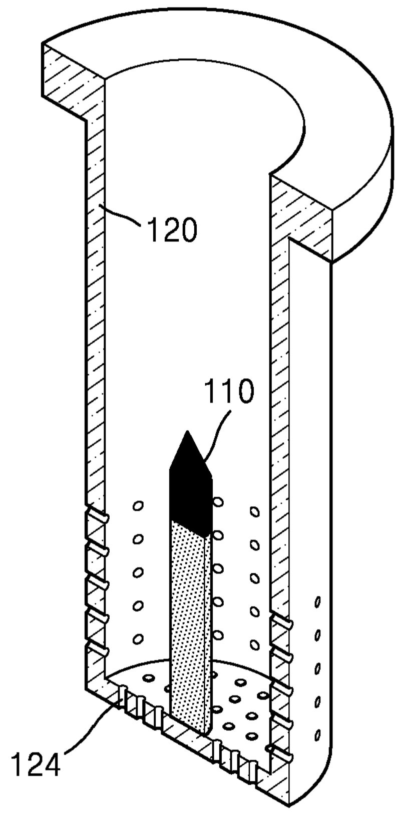
FIG. 5 is a diagram for explaining an ejector including at least one through hole according to some embodiments.

FIG. 5 is a diagram for explaining an ejector including at least one through hole according to an embodiment.

Referring to FIG. 5, an ejector 120 including at least one through hole 124 is shown. The through hole 124 may be formed to introduce external air into the ejector 120 to form an airflow flowing through the inside of the cigarette 200.

The through hole 124 may be formed on the bottom surface of the ejector 120 and the side surface of the ejector 120. The through hole 124 may be formed on the side surface of the ejector 120 at a position corresponding to the tobacco rod 210 accommodated in the ejector 120. External air introduced through the through hole 124 may form an airflow flowing through the tobacco rod 210.

External air may flow into the apparatus 100 through an external air inlet formed in the apparatus 100, and the external air flowed into the apparatus 100 may be introduced into the ejector 120 through the through hole 124 and then introduced into the cigarette 200. In addition, external air may flow into the gap between the side of the ejector 120 and the apparatus 100 and then may be introduced into the through hole 124 formed on the side of the ejector 120.

The through hole 124 formed in the ejector 120 may be used not only for introducing external air into the ejector 120 but also for cleaning the ejector 120 and the susceptor 110 after the ejector 120 is detached from the apparatus 100. Even if tobacco residue accumulates in the ejector 120 by repeated smoking, the tobacco residue may be easily removed from the ejector 120 and the susceptor 110 through the through hole 124.

Figure 6:
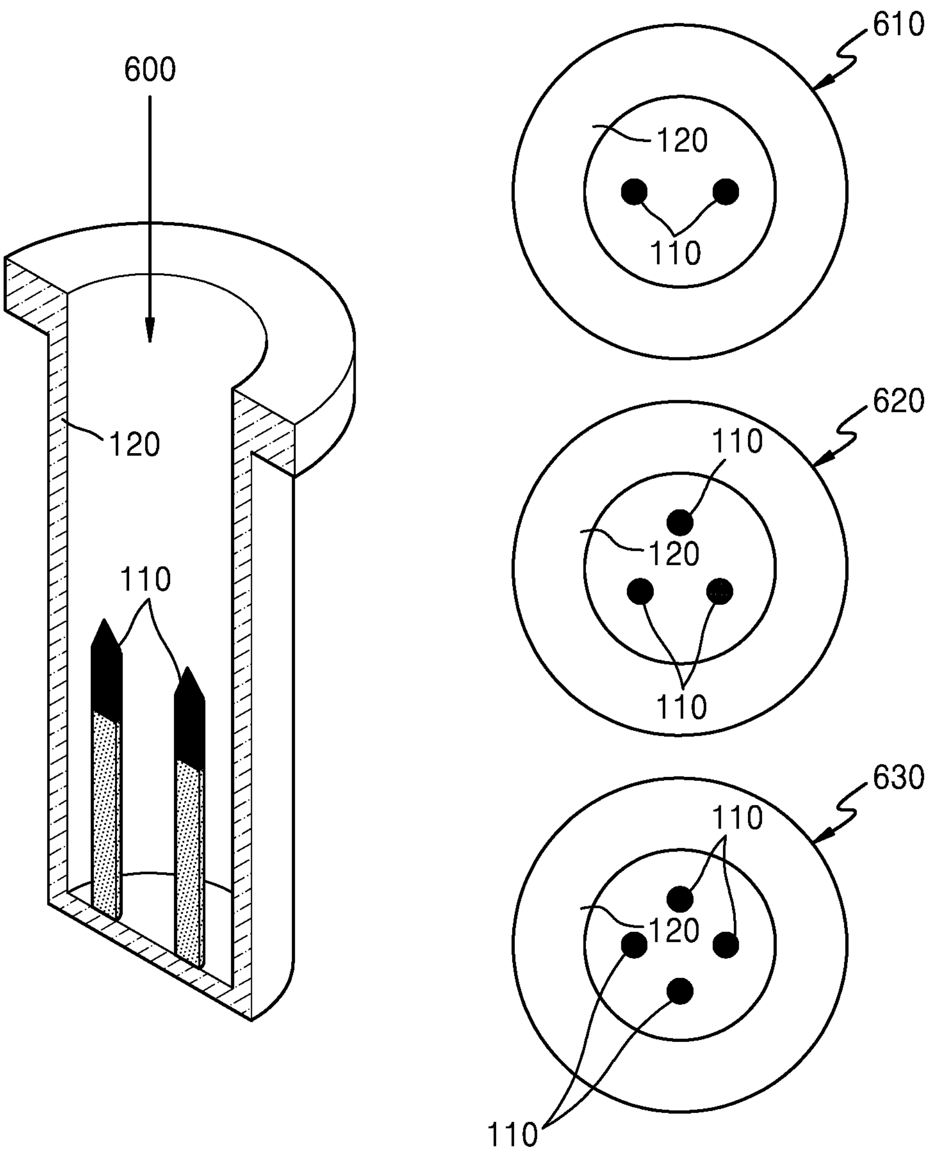
FIG. 6 is a diagram for explaining an ejector including two to four susceptors according to some embodiments.

FIG. 6 is a diagram for explaining an ejector including two to four susceptors according to some embodiments.

Referring to FIG. 6, an ejector 120 having two to four susceptors 110 is illustrated. A view 610 is an example of a plan view of an ejector 120 having two susceptors 110 seen in the direction 600. A view 620 is an example of a plan view of an ejector 120 having three susceptors (not shown in FIG. 6) seen from above, and a view 630 is an example of a plan view of an ejector 120 having four susceptors (not shown in FIG. 6) seen from above.

As shown in the views 610, 620, and 630, the ejector 120 may include two to four susceptors 110. However, the present invention is not limited thereto. The ejector 120 may include other appropriate number of susceptors other than two to four.

By including two to four susceptors 110 in the ejector 120, the cigarette 200 may be more uniformly heated. When single susceptor is provided in the ejector 120, a portion of the tobacco medium in the tobacco rod 210 close to the single susceptor is strongly heated, and a portion distant from the single susceptor may be weakly heated. On the other hand, by increasing the number of susceptors provided in the ejector 120, the tobacco medium may be uniformly heated throughout the tobacco medium in the tobacco rod 210.

When the number of the susceptor 110 included in the ejector 120 is changed, the shape of the susceptor 110 may also be changed. For example, in order to prevent excessive heating by the multiple susceptors 110, the susceptor 110 may be designed so that the thickness or cross-sectional area of the susceptors 110 decreases.

Figure 7:
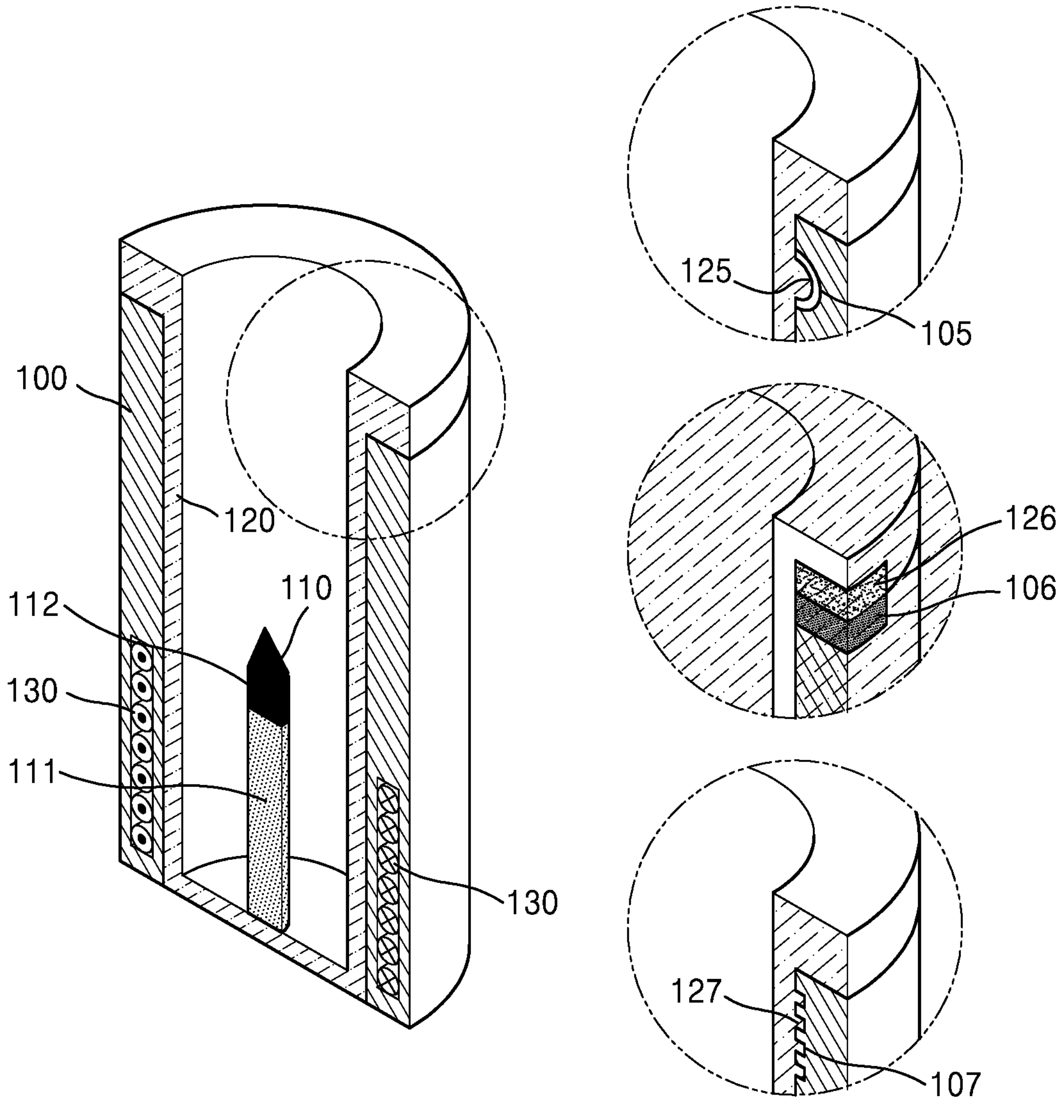
FIG. 7 is a diagram for explaining an ejector including a fixed structure according to some embodiments.

FIG. 7 is a diagram for explaining an ejector including a fixed structure according to some embodiments.

Referring to FIG. 7, examples of the ejector 120 including a fixing structure for fixing the ejector 120 to the apparatus 100 are illustrated. When the ejector 120 includes the fixing structure, the apparatus 100 may also include a structure that interacts with the fixing structure of the ejector 120 to fix the ejector 120.

For example, the ejector 120 may include a fixing structure 125, and correspondingly, the apparatus 100 may include a structure 105. The fixed structure 125 may include a protrusion or a convex portion, and the structure 105 may include as a groove or a concave portion, so that the ejector 120 can be fixed to the apparatus 100. The fixing structure 125 and the structure 105 may be made of a material having flexibility and elasticity so that the fixing structure 125 and the structure 105 may be deformed to allow the ejector 120 to be attached to or detached from the apparatus 100 and then may be restored back to original states.

As another example, the ejector 120 may include a fixing structure 126, and correspondingly, the apparatus 100 may include a structure 106. One of the fixing structure 126 and the structure 106 may be a permanent magnet, and the other of the fixing structure 126 and the structure 106 may be a metallic material attracted to the permanent magnet by the permanent magnet.

As another example, the ejector 120 may include a fixing structure 127, and correspondingly, the apparatus 100 may include a structure 107. The fixing structure 127 and the structure 107 may be formed to have structures like bolts and nuts, which are coupled to each other by rotating, such as a bottle cap. One of the fixing structure 127 and the corresponding structure 107 may include a spiral groove, and the other one may include a spiral protrusion, so that the fixing structure 127 may be engaged with the structure 107 by threads.

As the ejector 120 includes the fixing structure 127, the ejector 120 may be supported by the fixing structure, and thus, the ejector 120 may be prevented from being unintentionally separated from the apparatus 100.

The fixing structure for fixing the ejector 120 to the apparatus 100 is illustrated as being formed near one end of the ejector 120 at which the support 123 is located, but the location of the fixing structure is not limited thereto. The fixing structure of the ejector 120 and the structure of the apparatus 100 may be formed at any appropriate location where the ejector 120 and the apparatus 100 contact.

In addition to the fixing structure for fixing the ejector 120 to the apparatus 100, a separate structure that facilitates the ejector 120 to be detached from the apparatus 100 may be further included in the ejector 120. For example, the ejector 120 may include an elastic body, as the separate structure, that is deformed in a direction in which the ejector 120 is attached to the apparatus 100 when the ejector 210 is attached to the apparatus 100, thereby applying restoring force to the ejector 120 in a direction in which the ejector 120 is separated from the apparatus 100.

Figure 8:
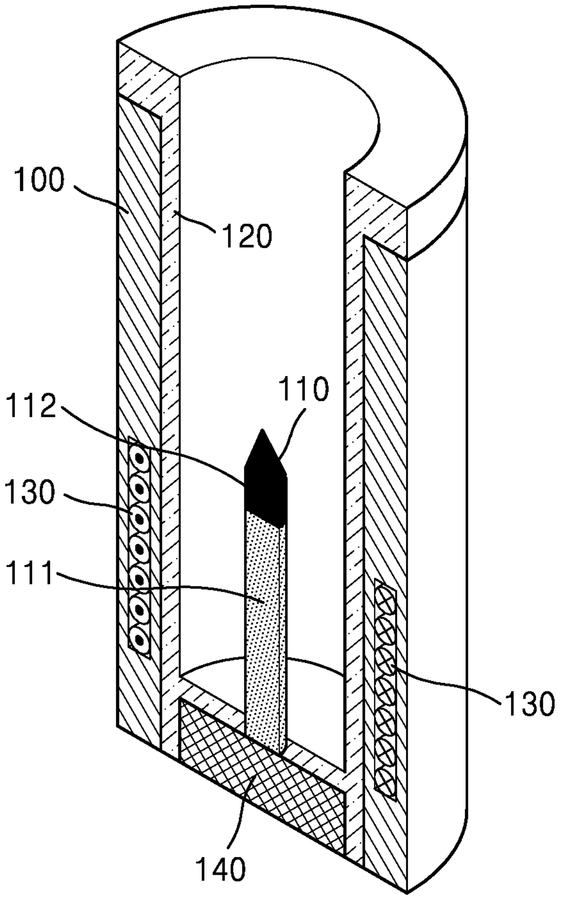
FIG. 8 is a diagram for explaining an apparatus for generating an aerosol further comprising a temperature sensor according to some embodiments.

FIG. 8 is a diagram for explaining an apparatus for generating an aerosol further comprising a temperature sensor according to an embodiment.

Referring to FIG. 8, the apparatus 100 may further include a temperature sensor 140 that measures the temperature of the susceptor 110. The temperature sensor 140 may directly or indirectly measure the temperature of the susceptor 110. The temperature sensor 140 may be a type of sensor that is not affected by the magnetic field applied by the coil 130.

As illustrated in FIG. 8, the susceptor 110 may penetrate the bottom surface of the ejector 120 so that the temperature of the susceptor 110 can be measured by the temperature sensor 140. Accordingly, the temperature sensor 140 may directly contact the susceptor 110 and may measure the temperature of the susceptor 110.

In another example, the apparatus 100 may further include an electrical contact (not shown) for electrically connecting the susceptor 110 attached to the apparatus 100 together with the ejector 120 to the apparatus 100, and the temperature sensor 140 may measure the temperature of the electrical contact. The temperature of the susceptor 110 may be measured from the temperature of the electrical contact measured by the temperature sensor 140. For example, the apparatus 100 may include an electrical contact arranged between the susceptor 110 and the temperature sensor 140 to connect the susceptor 110 with the temperature sensor 140. The electrical contact may be formed of a material having high thermal conductivity to have a temperature corresponding to the temperature of the susceptor 110. Alternatively, the electrical contact may be provided in the ejector 120 rather than in the apparatus 100.

When the electrical contact is provided, the electrical contact may be used for checking the state of the susceptor 110. For example, it may be determined whether the susceptor 110 is attached to the apparatus 100 based on a current test through the electrical contact.

As another example, the temperature sensor 140 may include an infrared sensor (not shown) that measures the temperature of the susceptor 110 without contacting the susceptor 110. When the temperature of the susceptor 110 is measured through the infrared sensor, a structure for connecting the susceptor 110 to the temperature sensor 140 may not be required, which makes the design of the apparatus 100 concise.

Unlike a conventional structure in which the susceptor is included in the cigarette, according to an embodiment, the susceptor 110 may be directly included in the apparatus 100 instead of being included in the cigarette 200. Therefore, the temperature of the susceptor 110 may be measured directly. Accordingly, since the temperature of the susceptor 110 may be controlled based on the temperature measured by the temperature sensor 140, the heating temperature of the cigarette 200 may be more precisely controlled, and the quality of an aerosol generated from the cigarette 200 may be improved.

Figure 9:
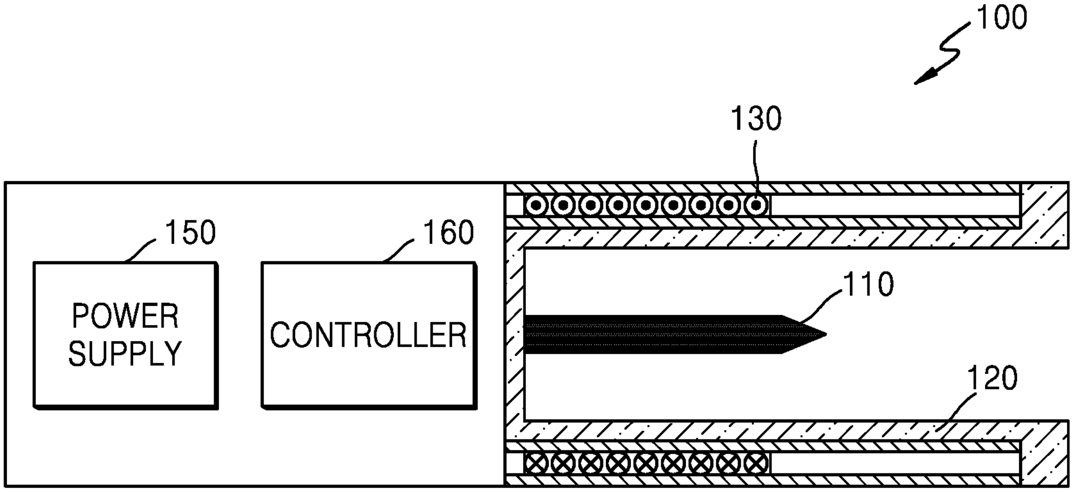
FIG. 9 is a diagram for explaining an apparatus for generating an aerosol further comprising a power supply and a controller according to some embodiments.

FIG. 9 is a diagram for explaining an apparatus for generating an aerosol further comprising a power supply and a controller according to an embodiment.

Referring to FIG. 9, the apparatus 100 may further include a power supply 150 and a controller 160. The power supply 150 may supply power to the coil 130, and the controller 160 may control power supplied to the coil 130.

The power supply 150 may include a battery supplying direct current to the apparatus 100, and a converter converting direct current supplied from the battery into alternating current for the coil 130.

The converter may include a low-pass filter that performs filtering on the direct current supplied from the battery and outputs alternating current to be supplied to the coil 130. The converter may further include an amplifier for amplifying the direct current supplied from the battery. For example, the converter may be a class-D amplifier including an amplifier and a load network constituting a low-pass filter. When the converter is a class-D amplifier, the coil 130 may be an inductor included in the load network of the class-D amplifier.

The controller 160 may be implemented as an array of a plurality of logic gates or can be implemented as a combination of a general-purpose microprocessor and a memory in which a program executable in the microprocessor is stored. Also, the controller 160 may include a plurality of processing elements.

The controller 160 may control the power supplied to the coil 130. When the temperature sensor 140 is further included in the apparatus 100, the controller 160 may control the power supplied to the coil 130 based on the temperature of the susceptor 110 measured by the temperature sensor 140.

The controller 160 may adjust at least one of the amplitude and the frequency of the alternating magnetic field applied to the susceptor 110 by controlling the power supplied to the coil 130. When at least one of the amplitude and the frequency of the alternating magnetic field applied to the susceptor 110 is adjusted, thermal energy emitted from the susceptor 110 may be adjusted. As such, the controller 160 may control the power supplied to the coil 130 to control the temperature at which the cigarette 200 is heated.

The amplitude and frequency of the alternating magnetic field applied to the susceptor 110 may be adjusted by adjusting the amplitude and frequency of the alternating current applied to the coil 130. The controller 160 may adjust the amplitude and frequency of the alternating magnetic field applied to the susceptor 110 by adjusting the amplitude and frequency of the alternating current applied to the coil 130. As such, the temperature at which the cigarette 200 is heated may be controlled.

The controller 160 may directly control the amplitude and frequency of the alternating current applied to the coil 130, but may also adjust the amplitude and frequency of the alternating current applied to the coil 130 by controlling the direct current supplied from the battery. For example, the controller 160 may perform pulse width modulation on a direct current pulse by the direct current supplied from the battery. As the direct current pulse is modulated before being input to the converter, the frequency of the output alternating current may be adjusted. In addition, the controller 160 may amplify the direct current pulse obtained from direct current of the battery through the amplifier. As the direct current pulse is amplified before being input to the converter, the amplitude of the alternating current output from the converter may be adjusted.

The controller 160 may control the power supplied to the coil 130 based on comparison between the temperature measured by the temperature sensor 140 and a reference temperature. For example, the controller 160 may calculate an error indicating a difference between the reference temperature and the temperature measured by the temperature sensor 140. The controller 160 may perform feedback control by the PID method based on at least one of a component proportional to the error, a component proportional to an integral value of the error, and a component proportional to the differential value of the error.

In the apparatus 100 according to the present disclosure, at least one susceptor 110 may be included in the apparatus 100 rather than inside the cigarette 200 in such a way that the temperature of the susceptor 110 may be directly measured, and the controller 160 may control the heating temperature of the cigarette 200 based on the measured temperature. As such, the temperature at which the cigarette 200 is heated may be kept constant, and the quality of the aerosol provided from the cigarette 200 may be improved.

Although the embodiments have been described in detail above, the scope of the present invention is not limited thereto, and various modifications and improvements by those skilled in the art using the basic concept of the present invention defined in the following claims also belong to the scope of the present invention.

What is claimed is:

1. An apparatus for generating an aerosol by an induction heating method, the apparatus comprising:

a battery supplying a direct current power to the device;

at least one susceptor formed in an elongated structure extending in a longitudinal direction of a cigarette to be accommodated in the apparatus, and arranged to be inserted into the cigarette to heat the cigarette;

an ejector including an accommodating space for accommodating the cigarette, and an opening formed at one end of the accommodating space so that the cigarette is inserted in the accommodating space, wherein the at least one susceptor is arranged at another end of the accommodating space opposite to the one end of the accommodating space, and the ejector is detachably coupled to the apparatus together with the at least one susceptor;

a coil arranged to surround the ejector along the longitudinal direction when the ejector is coupled to the apparatus, and configured to apply an alternating magnetic field to the at least one susceptor so that the at least one susceptor generates heat; and a controller that controls a power supplied to the coil by controlling the direct current power supplied from the battery based on the temperature of the susceptor.

2. The apparatus of claim 1, wherein the at least one susceptor includes:

a heating portion arranged at a portion of the at least one susceptor which contacts a tobacco medium portion of the cigarette when the at least one susceptor is inserted into the cigarette, and configured to generate heat due to the coil, and a non-heating portion arranged at a remaining portion other than the heating portion.

3. The apparatus of claim 2, wherein the coil has a size corresponding to the heating portion, and arranged at a position corresponding to the heating portion.

4. The apparatus of claim 1, wherein the ejector includes at least one through hole for introducing external air into the ejector to form an airflow flowing through the cigarette.

5. The apparatus of claim 1, wherein the ejector is made of a material having heat insulation and heat resistance.

6. The apparatus of claim 1, wherein a number of the at least one susceptor is two to four.

7. The apparatus of claim 1, wherein the ejector includes a fixing structure for fixing the ejector to the apparatus.

8. The apparatus of claim 1, further comprising a temperature sensor that measures a temperature of the at least one susceptor, wherein the temperature of the at least one susceptor is controlled based on the temperature measured by the temperature sensor.

9. The apparatus of claim 8, wherein the at least one susceptor, which is coupled to the apparatus together with the ejector, is electronically connected with the apparatus, and wherein the temperature of the at least one susceptor is measured based on the electrical connection of the susceptor with the apparatus.

10. The apparatus of claim 8, wherein the temperature sensor measures the temperature of the at least one susceptor without contacting the at least one susceptor.

11. The apparatus of claim 1, further comprising:

a power supply that supplies power to the coil; and a controller that controls the power supplied to the coil.

12. A system for generating an aerosol by an induction heating method, the system comprising:

an apparatus configured to generate an aerosol by the induction heating method; and a cigarette accommodated in the apparatus, wherein the apparatus includes:

a battery supplying a direct current power to the device;

at least one susceptor formed in an elongated structure extending in a longitudinal direction of the cigarette and arranged to be inserted into the cigarette to heat the cigarette;

an ejector including an accommodating space for accommodating the cigarette, and an opening formed at one end of the accommodating space so that the cigarette is inserted in the accommodating space, wherein the at least one susceptor is arranged at another end of the accommodating space opposite the one end of the accommodating space, and the ejector is detachably coupled to the apparatus together with the at least one susceptor;

a coil arranged to surround the ejector along the longitudinal direction when the ejector is coupled to the apparatus, and configured to apply an alternating magnetic field to the at least one susceptor so that the at least one susceptor generates heat; and a controller that controls a power supplied to the coil by controlling the direct current power supplied from the battery based on the temperature of the susceptor.

* * * * *